(12) United States Patent
Valzania Fresa

(10) Patent No.: US 9,173,523 B2
(45) Date of Patent: Nov. 3, 2015

(54) METHOD AND APPARATUS FOR LIGHTING CHARCOAL

(76) Inventor: Gilberto P. Valzania Fresa, Duluth, GA (US)

( * ) Notice: Subject to any disclaimer, the term of this patent is extended or adjusted under 35 U.S.C. 154(b) by 665 days.

(21) Appl. No.: 13/548,928

(22) Filed: Jul. 13, 2012

(65) Prior Publication Data

US 2013/0032134 A1 Feb. 7, 2013

Related U.S. Application Data

(60) Provisional application No. 61/513,812, filed on Aug. 1, 2011.

(51) Int. Cl.

| | |
|---|---|
| *C10L 11/04* | (2006.01) |
| *C10L 11/06* | (2006.01) |
| *A47J 37/07* | (2006.01) |
| *B65D 75/58* | (2006.01) |
| *B65D 27/34* | (2006.01) |
| *B65D 27/38* | (2006.01) |
| *F24B 15/00* | (2006.01) |
| *F23Q 13/04* | (2006.01) |

(52) U.S. Cl.
CPC ............... *A47J 37/079* (2013.01); *C10L 11/04* (2013.01); *C10L 11/06* (2013.01); *B65D 27/34* (2013.01); *B65D 27/38* (2013.01); *B65D 75/5805* (2013.01); *F23Q 13/04* (2013.01); *F24B 15/005* (2013.01)

(58) Field of Classification Search
CPC ... A47J 37/079; A47J 37/0768; F24B 15/005; C10L 11/04; C10L 11/06; C10L 5/368
See application file for complete search history.

(56) References Cited

U.S. PATENT DOCUMENTS

| | | | | | |
|---|---|---|---|---|---|
| 1,959,473 | A | * | 5/1934 | Heron | 44/519 |
| 2,870,955 | A | * | 1/1959 | Brady et al. | 206/459.5 |
| 3,010,809 | A | * | 11/1961 | Peck | 44/520 |
| 3,317,290 | A | * | 5/1967 | Gentry | 44/522 |
| 4,460,377 | A | * | 7/1984 | Kalil | 44/520 |
| 4,503,835 | A | * | 3/1985 | Williams | 126/25 B |
| 4,627,854 | A | * | 12/1986 | Pratt | 44/541 |
| 4,793,320 | A | * | 12/1988 | Bakic | 126/25 B |
| 4,906,254 | A | * | 3/1990 | Antosko | 44/520 |
| 4,953,533 | A | * | 9/1990 | Witt | 126/25 B |
| 5,186,721 | A | * | 2/1993 | Campana | 44/519 |
| 5,226,405 | A | * | 7/1993 | Snow | 126/25 B |
| 5,290,326 | A | * | 3/1994 | Campana | 44/519 |
| 2006/0042618 | A1 | * | 3/2006 | Gonzalez | 126/20 |
| 2008/0000467 | A1 | * | 1/2008 | Dudley et al. | 126/25 B |
| 2009/0095276 | A1 | * | 4/2009 | Kaye | 126/25 B |
| 2009/0205627 | A1 | * | 8/2009 | Timmons et al. | 126/25 B |
| 2009/0277438 | A1 | * | 11/2009 | Fischer et al. | 126/25 B |
| 2011/0000956 | A1 | | 1/2011 | Junge | |

* cited by examiner

*Primary Examiner* — David J Laux
(74) *Attorney, Agent, or Firm* — Baker Hostetler LLP

(57) ABSTRACT

A solid fuel starter assembly is provided with an envelope component made of combustible material; a foldable chimney component made of combustible material and a tear off strip component made of material and attached to the envelope component. The foldable chimney component is disposed inside a package formed by the envelope component and the tear off strip. The chimney component is a foldable flue component in the shape of a pyramid or cone.

12 Claims, 7 Drawing Sheets

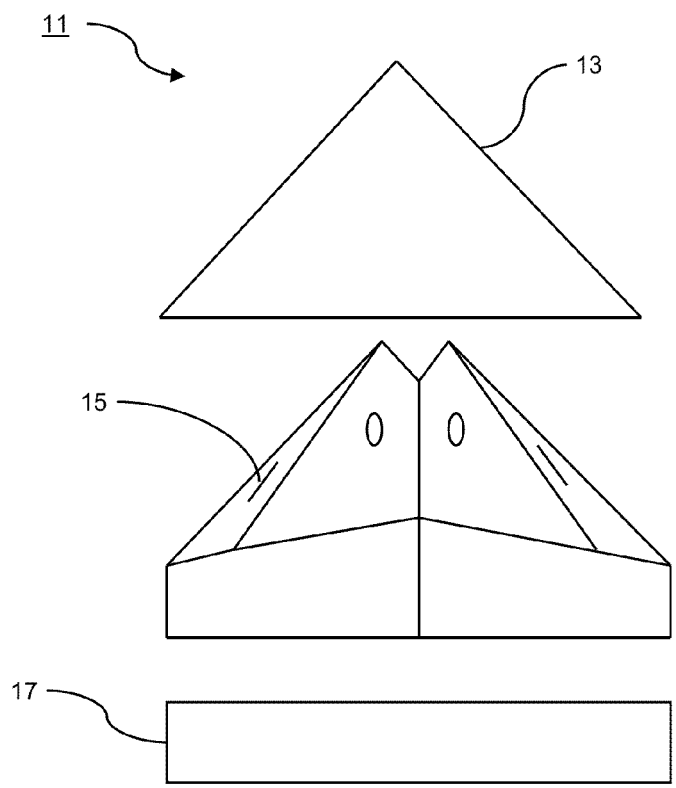
Figure 1
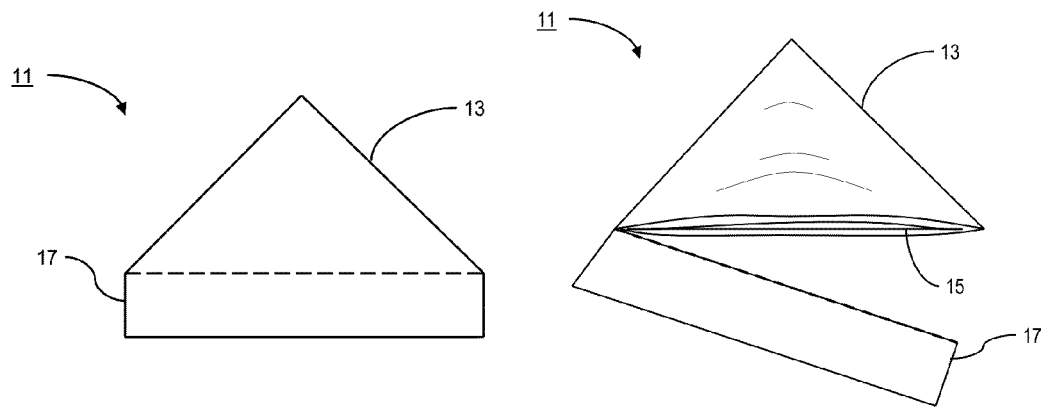
Figure 2
Figure 3

METHOD AND APPARATUS FOR LIGHTING CHARCOAL

CROSS REFERENCE TO RELATED APPLICATIONS

This application claims priority to U.S. Provisional Patent Application No. 61/513,812, Aug. 1, 2011, the contents of which is incorporated herein by reference in its entirety.

TECHNICAL FIELD

The subject matter disclosed herein relates to devices used to assist in the lighting of solid fuels such as charcoal. More specifically, but not by way of limitation, the subject matter of the disclosure relates to a foldable fully combustible solid fuel starter assembly.

BACKGROUND

Numerous methods and devices have been described for igniting solid fuels such as charcoal. Perhaps the most common is the use of a flammable liquid such as charcoal starter fuel. Typically, charcoal starter fuel is a mixture of kerosene and naphtha. In addition to being highly flammable, these fuels are highly toxic if inhaled or ingested. Another device used frequently for igniting charcoal is an electric charcoal starter that typically comprises a coil through which an electric current is passed causing the coil to become hot. The heat is then transferred to the charcoal which is then ignited. A disadvantage of the electric charcoal starter is that it requires a nearby source of electricity, making it inconvenient for campers, or lighting charcoal in parks where there is no nearby source of electricity. Yet another device for igniting charcoal is a chimney starter. The chimney starter is typically a metal cylinder with an internal charcoal grate. Charcoal is placed into the top of the cylinder and a crumpled newspaper is placed under the grate. The newspaper is lit and lights the charcoal above. The "chimney effect" causes the charcoal to light from the bottom all the way up to the top. A disadvantage of the chimney starter is that it requires the manipulation of lighted charcoal and remains hot even after charcoal has been poured out. Additionally, these devices are bulky (for example, 10.5"×6.5") and are inconvenient when carried a long distance.

Us Patent Application 2009/0095276 A1 (Published Apr. 16, 2009) ("Kaye") discloses a charcoal starter that is fully consumable through combustion. The starter takes the form of a container that includes one or more walls that define a top and bottom compartment. Solid fuel is deposited in the top compartment and kindling material is deposited in the bottom compartment. The divider allows for oxygenation and ventilation while also supporting the solid fuel in the top compartment. The starter is generally composed of a cardboard or other flammable, non-toxic material. The starter is configured such that solid fuel is supported in the top compartment for a period of time after the kindling material is lit and thereafter collapses and is completely consumed.

Kaye discloses a two-part embodiment comprising a first wall component 20 that includes a pair of substantially triangular divider elements. The first and second divider elements are formed in the wall and are each adapted to be folded relative to fold-lines. The device includes a pair of identical wall components with opposed engagement flaps to define a substantially rectangular apparatus. A disadvantage with the Kaye device is that the charcoal is confined within the walls of the device, cutting off side ventilation of the charcoals and when stacked the charcoals are not in an optimal pyramidal or conical stack. Additionally, the walls typically burn faster than the charcoal, resulting in the walls being consumed and the charcoal stack falling away from the kindling.

BRIEF DESCRIPTION OF THE INVENTION

There is a need for an easy to use, consumable, foldable solid fuel starter assembly.

In some embodiments, the solid fuel starter assembly comprises an envelope component made of combustible material; a foldable chimney component made of combustible material and disposed inside of the envelope component; and a tear off strip component made of material and attached to the envelope component.

In some embodiments the solid fuel starter assembly of claim 1 wherein in the foldable chimney component comprises a foldable flue component and a foldable peripheral component.

An embodiment for a method of starting the combustion of a plurality of solid fuel pieces is disclosed, comprising unfolding a foldable chimney component made of combustible material. A combustible medium is disposed below the foldable chimney components and the plurality of solid fuel pieces are disposed around the foldable chimney component. The combustible medium is ignited from the top of the foldable chimney component.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is an exploded view of charcoal starter assembly.

FIG. 2 illustrates a packaged charcoal starter assembly.

FIG. 3 illustrates a partially open packaged charcoal starter assembly.

DETAILED DESCRIPTION OF THE INVENTION

Figure 4:
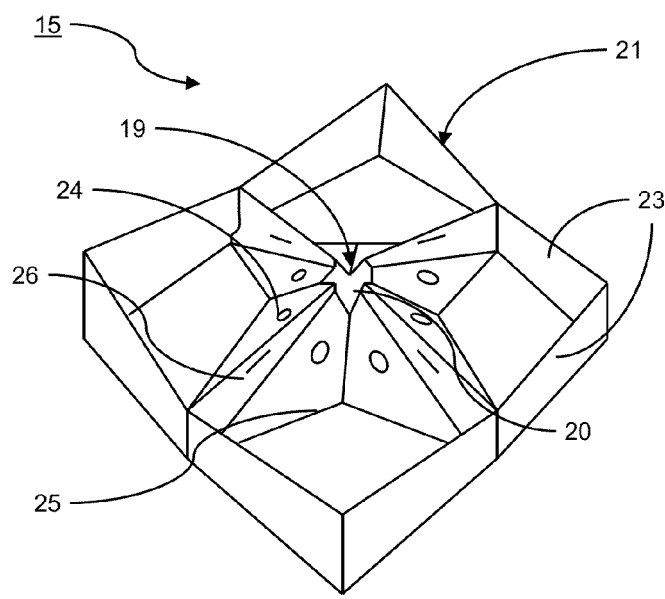
FIG. 4 illustrates an unfolded chimney component.

Referring now to the figures, where the various numbers represent like parts throughout the several views, FIG. 1 is an exploded view of the charcoal starter assembly 11. The charcoal starter assembly 11 includes an envelope component 13, a chimney component 15 and tear off strip component 17.

FIG. 2 illustrates the charcoal starter assembly 11 as packaged for distribution. The envelope component 13 is closed or sealed by the tear off strip component 17. As will be described later the tear off component 17 may serve as a wick for igniting a combustible medium, and additionally it provides a medium on which instructions for the use of the charcoal started assembly may be printed.

FIG. 3 illustrates the charcoal starter assembly 11 wherein the tear off strip component 17 is partially detached from the envelope component 13 before the removal of the chimney component 15.

The charcoal starter assembly 11 is preferably made out of the combustible material such as paper, paperboard, wood, cardboard, natural fibers or in some cases plastic that is foldable, yet provides structural integrity when the flue component 19 is assembled. In one embodiment the charcoal starter assembly 11 is made out of the combustible material that is impregnated with an accelerant. In one embodiment the accelerant is a non-toxic accelerant such as food oil or wax.

FIG. 4 illustrates an embodiment of the chimney component 15. The chimney component 15 includes a flue component 19 having an opening 20 at the top and a peripheral component 21. The peripheral component 21 may be comprised of a plurality of peripheral wall retaining segments 23. The peripheral component 21 acts as a retaining structure for the lowest layer of the solid fuel. In one embodiment, the peripheral component 21 is of a height that less than or equal to the height of the solid fuel pieces.

The flue component 19 is attached to the peripheral component 21. The entire chimney component is foldable, and may be folded in a way that can be inserted into the envelope component 13. In one embodiment, the flue component 19 may be provided with a plurality of openings 24 to facilitate the transport of air to the combustible medium as described below. In the embodiment illustrated in FIG. 4 the flue component 19 includes a pair of substantially triangular side walls 25 and a substantially triangular top portion 26.

As may be appreciated by one of ordinary skill in the art, the charcoal starter assembly 11 may be made of different sizes. In one embodiment, the envelope component 13 may be approximately 15×23 cm, while the tear off strip component 17 may be approximately 7×23 cm.

Figure 5:
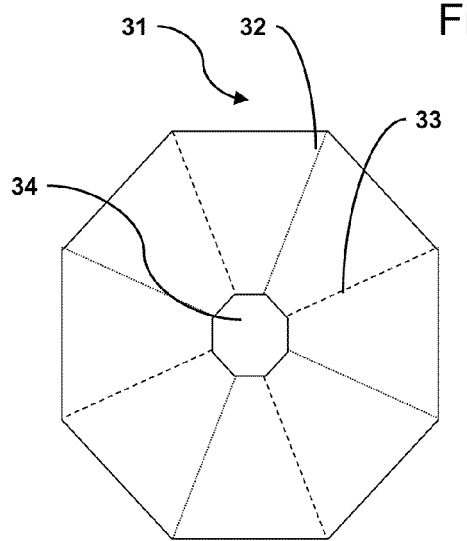
FIG. 5 illustrates an embodiment of a blank for making a chimney component.

Illustrated in FIG. 5 is an embodiment of a flue component 31 that is octagonal in shape when fully unfolded. The flue component 31 is provided with a number of top folds 32 and a number of bottom folds 33. At the center of the flue component 31 is an octagonal opening 34. The flue component 31 may be folded so that the bottom fold 33 provides support for the solid fuel pieces to be stacked on the flue component 31.

Figure 6:
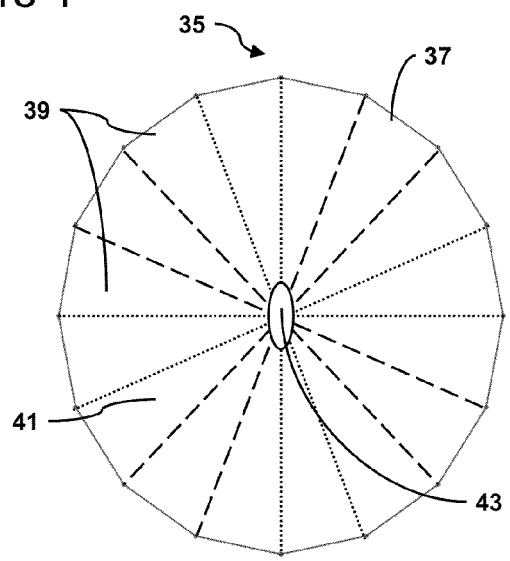
FIG. 6 illustrates an alternate embodiment of the blank for making a chimney component.

Illustrated in FIG. 6 is an embodiment of the flue component 35 that is in the shape of a hexadecagon. The hexadecagon flue component 35 may be provided with a plurality of fold lines along a segment that will serve as a top member 37 for the flue component 35. The hexadecagon flue component 35 may be provided with a plurality of fold lines along segments that will serve as side members 39 for the flue component 35. The side members 39 provide support to the top member 37. The hexadecagon flue component 35 may be provided with a plurality of fold lines along segments that will serve as a bottom member 41 for the flue component 35. The hexadecagon flue component 35 may be provided with an opening 43.

Figure 7:
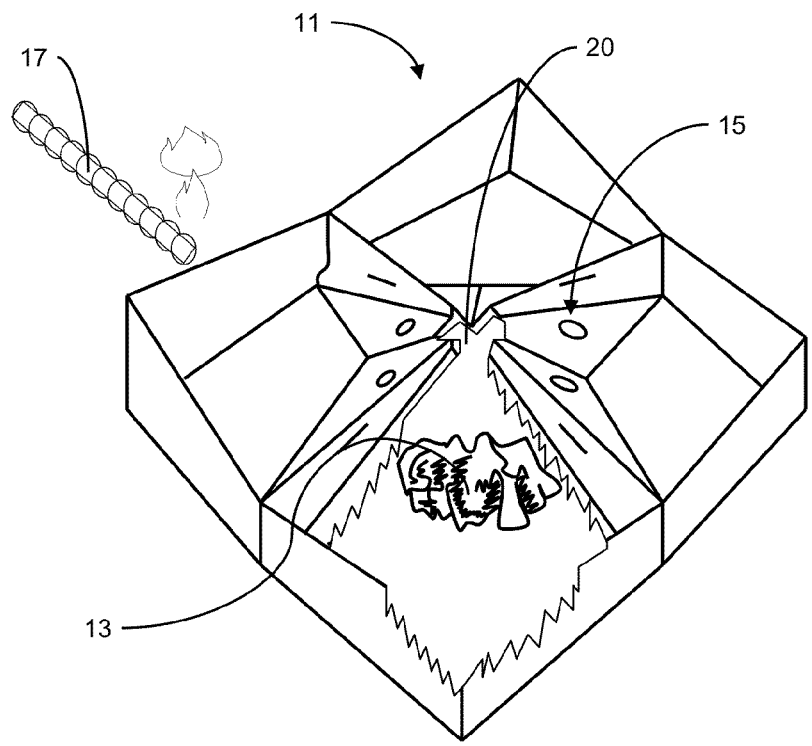
FIG. 7 is a partial cutaway view of the chimney component.
Figure 8:
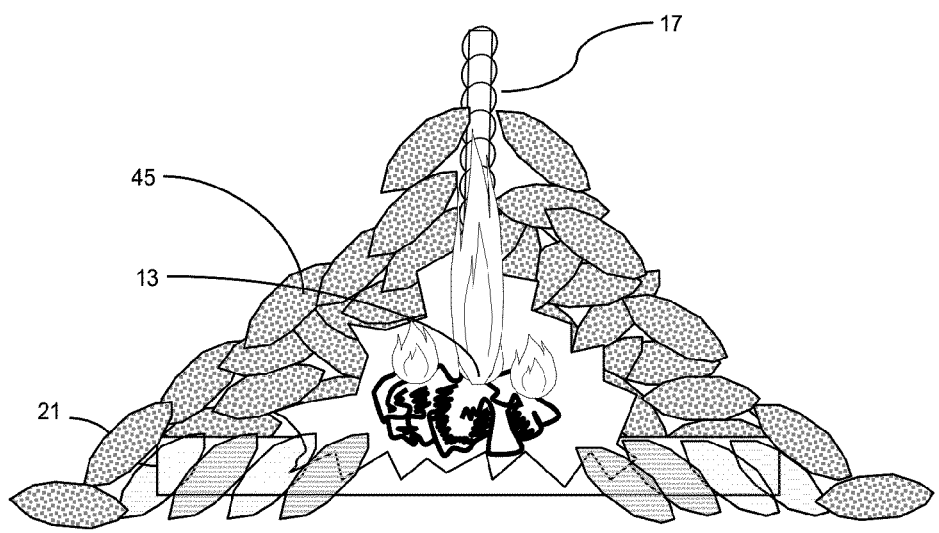
FIG. 8 is a partial cutaway view of the chimney component holding a stack of solid fuel pieces.
Figure 9:
FIG. 9 is a partial cutaway view of the chimney component holding a stack of solid fuel pieces.

FIGS. 7, 8 and 9 illustrate the operation of an embodiment of a charcoal starter assembly 11. The chimney component 15 is unfolded. The envelope component 13 is made into a wad and inserted below the chimney component 15. The tear off component 17 may be wound up into a spiral and lit. A pyramidal stack of solid fuel pieces 45 is disposed within the peripheral component 21. The chimney component 15 forms an internal air chamber 36 that provides a volume that facilitates air flow and where combustion may be enhanced. The envelope component 13 is lit by inserting the lit tear off component through the flue opening 20. Once lit, the envelope component 13 will light the solid fuel pieces 45. An advantage of the charcoal starter assembly is that the flame that ignites the charcoal is kept substantially within the internal air chamber 36 providing a safer low or contained flame. Another advantage is that the charcoal starter assembly 11 is a standalone structure, that requires no additional user involvement once the envelope component 13 is lit.

To light the solid fuel pieces, the user of the charcoal lighter assembly 11 would separate the component 17 from the envelope component 13. The user would then remove and unfold the folded chimney component 15 from the envelope component 13. The chimney component 15 would be placed where the solid fuel pieces 45 are intended to be lit, for example a barbecue grill. The envelope component 13 is crumpled and placed under the chimney component 15. The solid fuel pieces 45 are disposed completely covering the chimney component 15. The tear off strip component 17 is spirally wound and lit with a match or lighter. The lit tear off strip component 17 is inserted through the flue opening 20 and is used to light the envelope component 13. In some cases it may be necessary to remove some of the solid fuel pieces 45 at the top of the stack in order to make the flu opening 20 accessible to the user. If that is the case, then the solid fuel pieces 45 that were removed may be replaced once the envelope component 13 is lit.

The peripheral component 21 is used to contain the first layer of the stack of solid fuel pieces 45, thereby creating a base of a substantial pyramidal or conical stack of solid fuel pieces 45. The rest of the stack of solid fuel pieces 45 can then be arranged around the flue component 19 to create the pyramidal or conical stack.

As shown in FIG. 9, the envelope component 13, the peripheral component 21 and the chimney component 15 (not shown) all burn to provide a wide area of combustion while maintaining the shape of the stack of solid fuel pieces 45.

Figure 10:
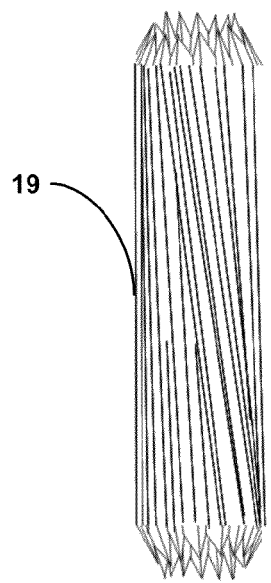
FIG. 10 illustrates an alternate embodiment of a folded flue component.

Illustrated in FIGS. 9 and 10 is an alternate embodiment of a flue component 19. In this embodiment the flue component 19 comprises a pleated paper material that can be wound into a cylindrical component and then unfolded much like an umbrella to provide a pleated shape as illustrated in FIG. 10.

Figure 11:
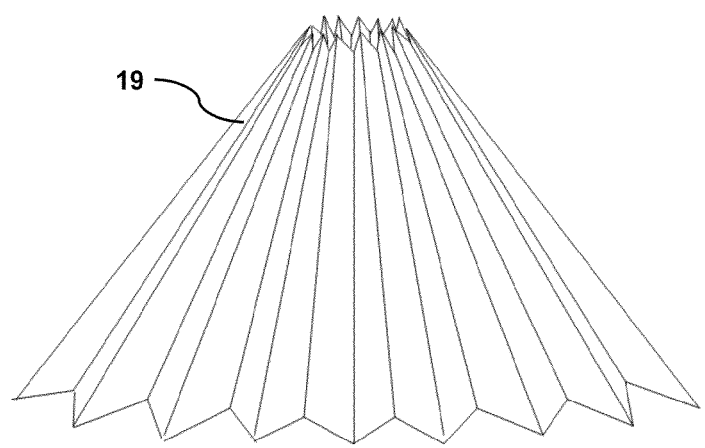
FIG. 11 illustrates an alternate embodiment of an unfolded flue component.
Figure 12:
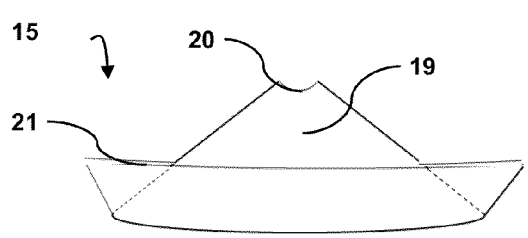
FIG. 12 is a side view of an alternate embodiment of a folded charcoal starter assembly.
Figure 13:
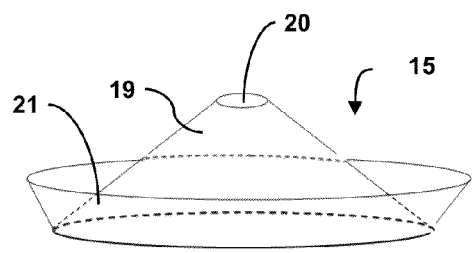
FIG. 13 is a side view of an alternate embodiment of an unfolded charcoal starter assembly.
Figure 14:
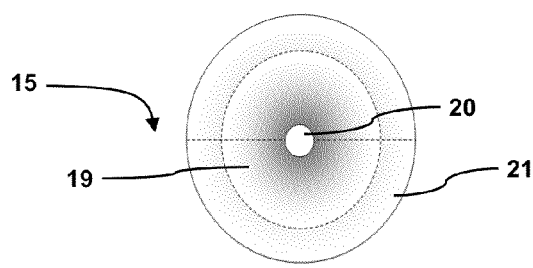
FIG. 14 is a top view of an alternate embodiment of an unfolded charcoal starter assembly.

Illustrated in FIGS. 9 and 10 and 11 is another embodiment of a chimney component 15, with a flue component 19 that is conical in shape. The peripheral component 21 may be cylindrical. The chimney component 15 may be folded flat when inserted into the envelope component 13 and unfolded by pulling on two opposed sections. It should be noted that these are representative examples of the many shapes of the chimney component 15. Many other shapes may be in effect to fit the operation of the charcoal starter assembly 11.

Figure 15:
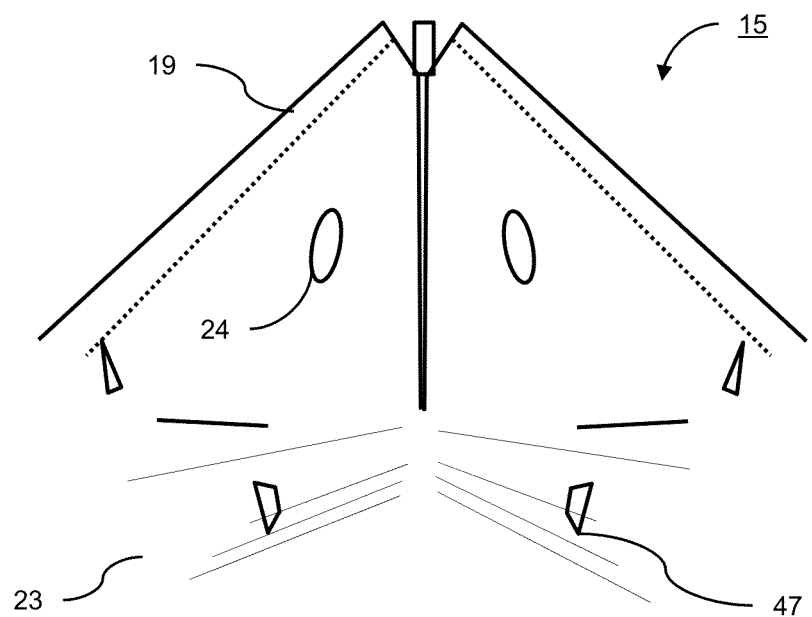
FIG. 15 is a side view of an alternate embodiment of an unfolded charcoal starter assembly.
Figure 16:
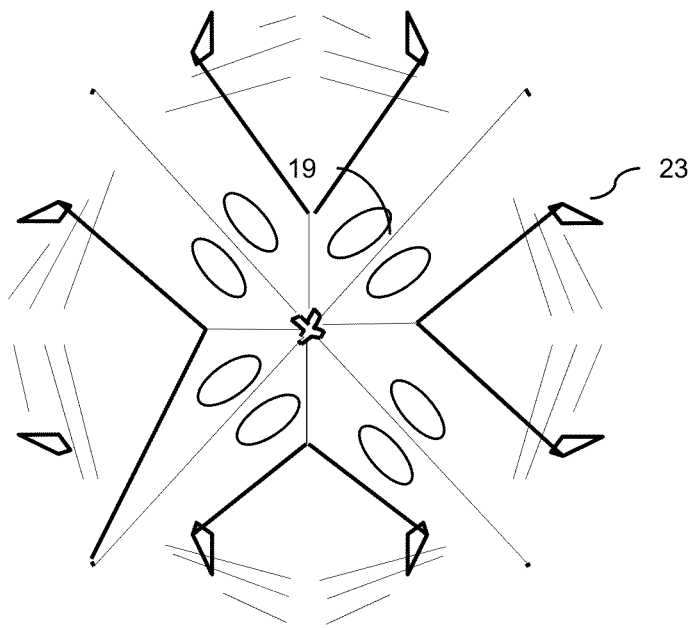
FIG. 16 is a top view of an alternate embodiment of an unfolded charcoal starter assembly.
Figure 17:
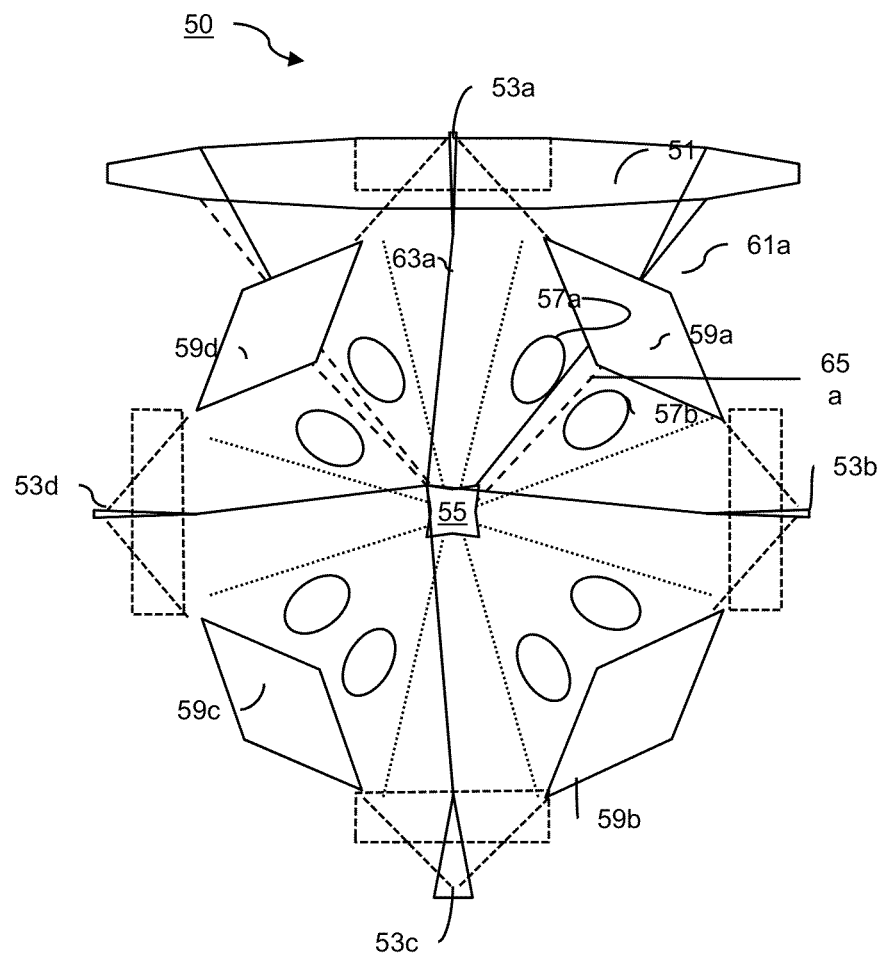
FIG. 17 is a top view of an alternate embodiment of a blank for a charcoal starter assembly.
Figure 18:
FIG. 18 is a side view of an alternate embodiment of a folded charcoal starter assembly.

Illustrated in FIGS. 15-18 is an alternate embodiment of a charcoal starter assembly 11 having a larger charcoal capacity. As shown in FIG. 15, the peripheral wall retaining members 23 are angled upwardly and are provided with bottom points 47 that act as support members or feet. This arrangement provides for additional air passages during combustion. The periphery of the retaining members form a substantially octagonal shape when viewed from the top (FIG. 16). FIG. 17 illustrates a single sheet blank 50 from which the chimney component may be formed. The single sheet blank 50 is substantially a 12-sided polygon having twelve sides 51. Four of the sides may be provided with a cut 53a, 53b, 53c, and 53d. The center of the single sheet blank 50 may be provided with a cut away portion 55. A plurality of openings, e.g 57a and 57b, may be provided on the single sheet blank 50. Four lateral cuts 59a, 59b, 59c, and 59d may also be provided. Exterior folds (see e.g. 63a) may be provided along the cut portion 53a, and interior fold 65 may be provided to facilitate folding. FIG. 18 shows the assembled chimney component 15 folded into a flat substantially triangular member that can be inserted into a substantially triangular envelope component (not shown).

In another embodiment, the charcoal starter assembly 11 may be molded as a single component. The charcoal starter assembly 11 may be formed from a pulp slurry. A mold may be coated with a pulp slurry and after a predetermined thickness of fiber is built up on the mold a forming die compacts dries the slurry to form an integral charcoal starter assembly 11.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A chimney component for starting solid fuels comprising:
   a foldable flue portion made of combustible material having a substantially pyramidal shape when in use and adapted to be foldable into a flat substantially triangular shape when disposed inside of an envelope; and
   a foldable peripheral portion made of combustible material and attached to the foldable flue component wherein the peripheral portion comprises a plurality of segments in a substantially polygonal shape and adapted to be folded flat when disposed inside the envelope.

2. The chimney component of claim 1 wherein the foldable flue component has a plurality of openings to facilitate the transport of air.

3. The chimney component of claim 1 wherein the foldable flue portion has a top and a hole at the top.

4. The chimney component of claim 1 wherein the foldable flue component is made of cardboard.

5. The chimney component of claim 4 wherein the foldable flue component is impregnated with an accelerant.

6. The chimney component of claim 1 wherein the polygonal shape is an octagonal shape.

7. The chimney component of claim 1 were in the polygonal shape comprises a hexadecagon.

8. A solid fuel starter assembly comprising:
   an envelope component made of combustible material;
   a foldable chimney component made of combustible material from a single blank that is transformable between a flat configuration when disposed inside of the envelope component, and a substantially pyramidal shape when unfolded, the foldable chimney component comprising:
      a foldable flue portion made of combustible material having a plurality of substantially triangular portions foldable into a flat substantially triangular shape when disposed inside the envelope component and adapted to be unfolded into a substantially pyramidal shape when in use; and
      a foldable peripheral portion made of combustible material wherein the peripheral portion comprises eight segments which are folded flat when disposed inside the envelope component and adapted to be unfolded into a substantially octagonal shape when in use; and
   a wick made of combustible material.

9. The solid fuel starter assembly of claim 8 wherein the foldable flue portion has a hole at the top.

10. The solid fuel starter assembly of claim 9 wherein the foldable flue component comprises a plurality of openings to facilitate the transport of air during combustion.

11. The solid fuel starter assembly of claim 8 wherein the foldable flue component comprises an accelerant.

12. The solid fuel starter assembly of claim 11 wherein the combustible material is one selected from among the group consisting of wood, paper, paperboard, cardboard, natural fiber and plastics.

* * * * *